United States Patent [19]
Zika et al.

[11] Patent Number: 5,190,272
[45] Date of Patent: Mar. 2, 1993

[54] ACTUATOR AND PALLETIZING SYSTEM

[75] Inventors: Frank J. Zika, LaGrange; Henry J. Flair, Franklin Park, both of Ill.

[73] Assignee: Snow/Taft-Peirce Company, Bellwood, Ill.

[21] Appl. No.: 631,370

[22] Filed: Dec. 20, 1990

[51] Int. Cl.⁵ .................................................. B23Q 3/10
[52] U.S. Cl. .................................................. 269/309
[58] Field of Search ............. 279/2 R, 2 A; 269/309, 269/310, 48.1, 43, 234; 228/49.3

[56] References Cited

U.S. PATENT DOCUMENTS

| | | | |
|---|---|---|---|
| 4,500,079 | 2/1985 | Morghen | 269/309 |
| 4,646,419 | 3/1987 | Glessner et al. | 269/329 |
| 4,720,114 | 1/1988 | Braitmaier et al. | 269/48.1 |
| 4,776,507 | 10/1988 | Hoffmann | 269/48.1 |
| 4,863,323 | 9/1989 | Glaser | 279/2 R |
| 4,932,642 | 6/1990 | Salenbien et al. | 269/309 |

Primary Examiner—Robert C. Watson
Attorney, Agent, or Firm—Patula & Associates

[57] ABSTRACT

An actuator for selectively coupling a pallet with a complementary pallet base. A pair of multitoothed rings to couple the pallet with a pallet base. A co-axial piston and cam for driving the multitoothed rings together or apart. A force driving source for selectively activating the piston and cam.

34 Claims, 9 Drawing Sheets

ACTUATOR AND PALLETIZING SYSTEM

The invention relates to an actuator for a palletizer for use with workholding equipment for the machine tool industry.

BACKGROUND OF THE INVENTION

In the past, there have been many different systems and devices for securing workpieces at sequential work stations in order that a series of steps can be completed on a workpiece in an efficient and timely manner. In an automated environment, the ability of a pallet base to temporarily grasp a pallet supporting a workpiece to allow some particular function to be performed on the workpiece, such as grinding, milling, measuring etc. and then upon completion of the function, to quickly move the workpiece to the next work station, has become an absolute necessity.

Many prior devices such as that shown in U.S. Pat. No. 4,643,410 to Mudge et al. advanced the art of coupling and carrying the workpiece to associated equipment to perform the desired task, by readily and reliably performing the desired transfer operations. However, with the advent of computerized controls and computer aided design and manufacturing processes, the need for increased speed, accuracy and higher duty cycles have made it necessary to provide the performance and features of the present invention.

U.S. Pat. No. 4,575,062 to Mudge et al. relates to similar pallet and pallet base devices but utilizes a time consuming and cumbersome method of clamping in performance of the coupling mode between palletizer or pallet base and pallet. Additionally, the clamping device, disclosed in U.S. Pat. No. 4,575,062 utilizes numerous components that not only increase the cost of the device, but also the resultant maintenance and overall slower operational speed of the device in comparison to the present invention.

It is a primary object of the present invention to provide a improved actuator for a workholding coupling system.

It is another object of the invention to be able to accurately sense the physical position of the palletizer in relation to the carrier.

It is yet another object to have the palletizer and carrier free of other mechanical or physical forces that might affect the ultimate accuracy of the machining process on the workpiece.

It is yet another object of the invention to be capable of indexing with separate and outside mechanisms.

It is still yet another object of the invention to have minimum vertical pallet travel above the palletizer to increase the speed of the overall process by saving time between work stations.

It is still yet another object of the invention to utilize a center hole power application site for the actuator for use with a chuck or other accessory device.

Numerous other advantages and features of the invention will become readily apparent from the detailed description of the preferred and alternative embodiments of the invention, from the claims, and from the accompanying drawings, in which like numerals are employed to designate like parts throughout the same.

BRIEF SUMMARY OF THE INVENTION

The present invention is an actuator for a palletizer used in an automated series or line in which workpieces are placed on a pallet or carrier which is coupled by a palletizer coupling which is activated by the present invention.

Multitoothed rings are affixed to the pallet and pallet base coupling to complementary mesh and couple with each other. The present invention utilizes either a mechanical, electro-mechanical piston and cam assembly which is co-axial to each other to activate the pallet base coupling. The piston and cam assembly are activated by a mechanical, electro-mechanical, pneumatic or hydraulic force driving means which is selectively applied or removed as per the desired coupling or uncoupling operation. The workpiece is set up a single time on a pallet and is then selectively grasped by a series of pallet base couplings as the pallet and workpiece travels down a sequential workstation line.

It has been found that a pallet and base coupling of this type, can be effectively utilized for orientating a workpiece at sequential work stations in a highly precise manner. A different receiver or palletizer is secured at each of a plurality of sequential work stations for the overall desired machining of a workpiece. A high degree of precision, plus the elimination of many lengthy and time consuming set up and adjustment procedures such as individual set up and alignment of workpieces at each station provide superior performance.

DESCRIPTION OF THE DRAWINGS

A fuller understanding of the foregoing may be had by reference to the accompanying drawings, wherein.

DESCRIPTION OF THE EMBODIMENT

Figure 1:
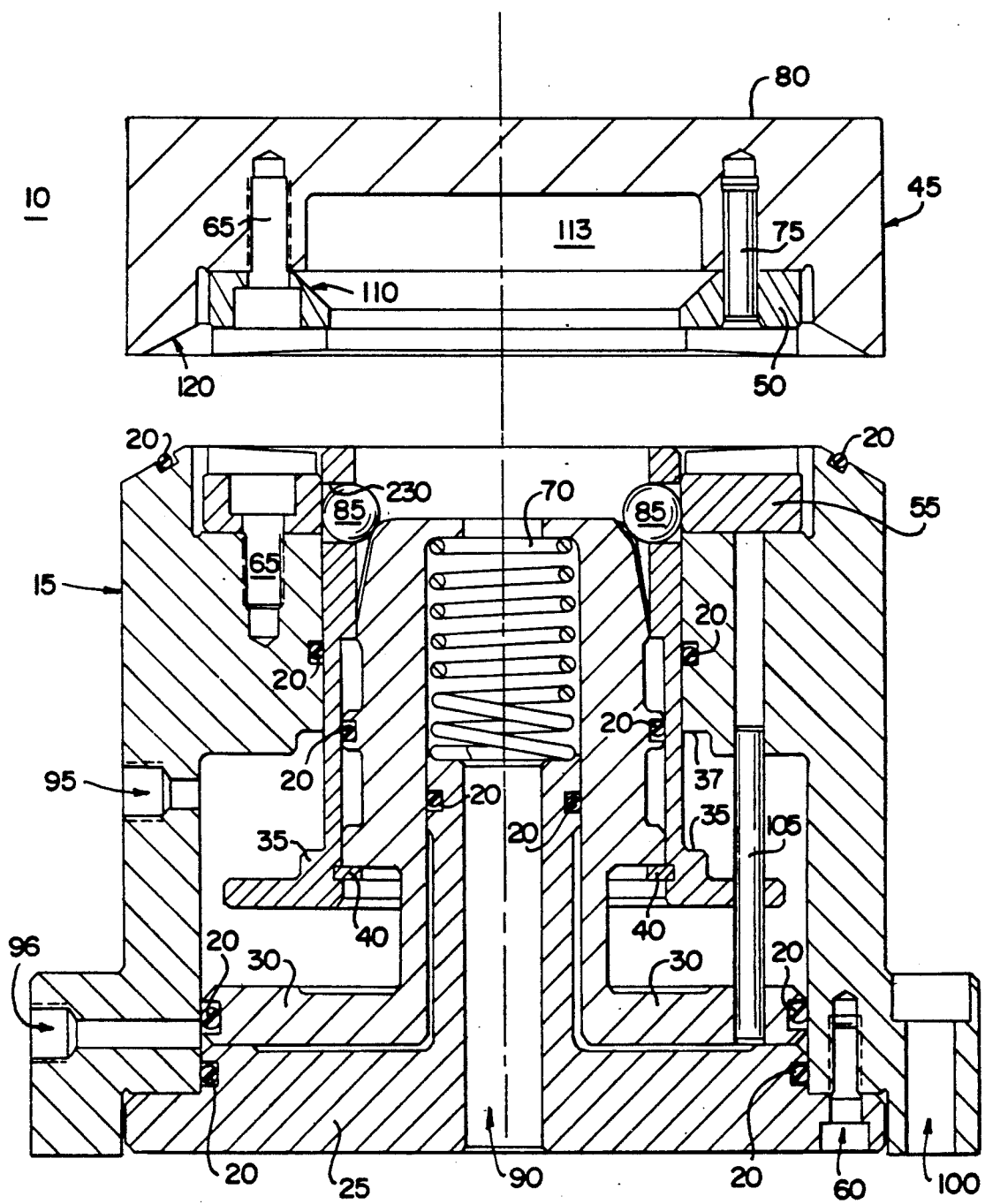
FIG. 1 is a side cross-sectional view of the preferred snap ring actuator embodiment of the present invention.

While the invention is susceptible of embodiment in many different forms there is shown in the drawings and will be described herein in detail, a preferred embodiment of the invention. It must be understood, however, that the present disclosure is to be considered an exemplification of the principles of the invention and is not intended to limit the spirit and scope of the invention and/or claims of the embodiment illustrated.

The present invention is a palletizing actuator which utilizes a co-axial sequential piston to selectively grasp a pallet or carrier and then to release it upon completion of the desired function on the workpiece positioned on the pallet.

The preferred embodiments shown and described utilize either pneumatic or hydraulic fluid media systems as the power driving source for the actuator. A general operational description follows.

Figure 2:
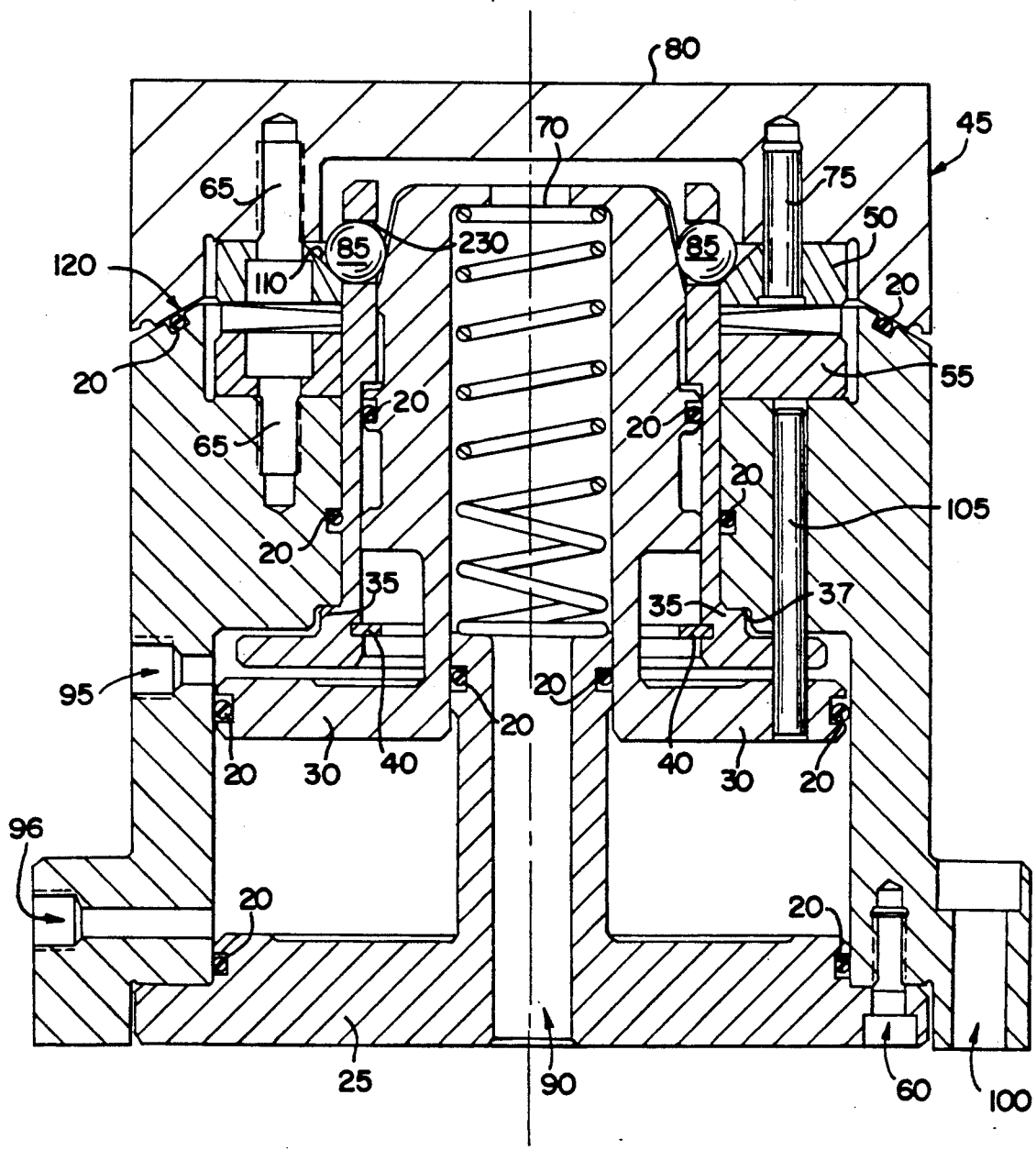
FIG. 2 is a side cross-sectional view of the preferred embodiment in coupled and locked mode of the present invention.
Figure 3:
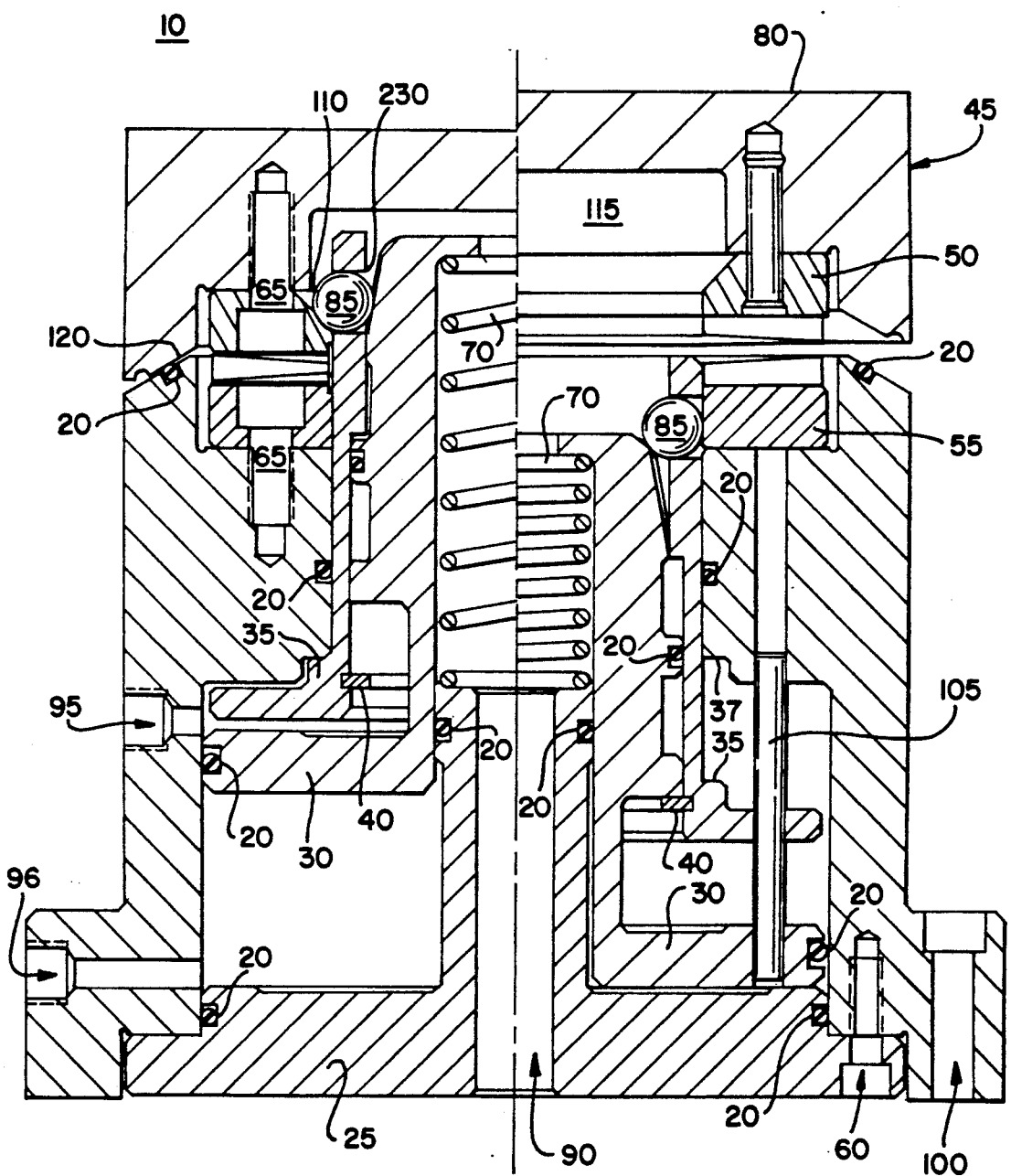
FIG. 3 is a side cross-section view of the preferred embodiment in which one half the pallet is coupled and locked and one half is unlocked and the pallet is being removed.

As shown in FIGS. 1-3, the function of the pneumatic air driving system within the activator of the present invention is to independently lift the piston/ball bearing retainer assembly into position to avoid having the balls track along the wall surfaces and possibly prematurely lock on another component or inadvertently lift a pallet from its coupled and seated position.

Assuming a starting position with both the piston/-cam and the piston/ball bearing retainer assembly in the low position or in locked pallet position, air is introduced into the lower actuation media port. Air acts on the piston/cam assembly, moving it vertically, wherein the piston/ball bearing retainer assembly carries the unloaded ball bearings. The O-ring is then sealed to the housing bore.

After the piston/ball retainer reaches the top of its stroke, the piston/cam acts as the functional piston and air is vented through the exhaust port.

When the piston/ball retainer reaches its stop, the locking ball bearings are free to move outward, driven by the piston/cam until they reach the locking surfaces to hold the pallet assembly in position.

To unlock the mechanism thereby allowing pallet disengagement, the actuator's lower actuation media port is set to exhaust and the upper actuation media port is pressurized. The piston/cam begins its movement downward, breaking the locking force. As it moves to the point where it engages the guide pin or snap ring, the locking ball bearings are free to move from the locking position toward the center. Limiting the distance in which the piston/cam moves down within the piston/ball bearing retainer assembly allows the assembly to be used to retain the locking ball bearings in place.

As the assembly moves downward, the piston/ball bearing retainer assembly moves downward. Air is actuating the piston/ball bearing retainer assembly and piston/cam assembly to the bottom in its fully unlocked and retracted position.

Referring now to FIGS. 1-3 of the preferred snap ring actuator embodiment, the starting position of the actuator is the unactuated position in which the pallet carrier 80 is ungrasped or positioned above the receiver. The piston 30 is in the lowest positioned down against core guide 25. Piston ball retainer 35 is also in its lowest position and it is held in position by a snap ring 40 and in relationship with the ball bearings 85. Pallet assembly 45 is about to be placed onto the actuator base 15. Pallet assembly 45 is lowered on to the actuator base 15 and located in place with the correspondingly meshing of the upper and lower couplings shown as pallet multitoothed carrier rings 50 and 55. Once this is in place, air pressure or some hydraulic media is introduced and lower actuation port 96 actuates the piston/cam 30, which raises piston/ball bearing retainer assembly 35 and O-rings 20 together. These assemblies travel upward to the extremes of their limits 35 stopping against piston ball retainer stop surface 37. Piston and cam 30 -continue on further to force all ball bearings 85 outward until they rest against locking face surface 110. As the piston and cam 30 move up into its final locking position against locking cam surface 155, it acts against the ball bearings 85 to force it against locking face 110 thereby completely locking the actuator base to the pallet 45.

At this time, the invention 10, composed of actuator base 15 and pallet 45 is in the locked or coupled positioned enabling the palletizer to allow a workpiece, which would be seated upon pallet carrier 80 to be machined or otherwise worked upon as necessary.

After the desired machining on the workpiece has been completed, the actuator base 15 will release the pallet 45 by applying air or other hydraulic media through the upper actuation media port 95 into actuator base 15. The air forced in acts on piston and cam 30 moving it downward allowing the ball bearings 85 to retract into bearing retainer passage 140. Piston ball retainer 35 is now lowered by snap ring 40, unlocking actuator surface 170 in contact with snap ring 40 pulling piston ball retainer 35 downward, resultant force rolling along in locking face 110 rolling the ball bearings 85 inward until they are free from the pallet assembly 45 and allowing the entire mechanism composed of ball bearings 85, piston ball retainer 35, snap ring 40 and piston and cam 30 to move downward until they rest against core guide 25 and come to a stop. The pallet assembly 45 is then free to be removed or lifted from place by moving it upward a minimum height to clear multitoothed carrier ring 50 and actuator bases 15 multitoothed carrier ring 55 and then the pallet assembly 45 is free to move in any direction sideways or vertically or any combination of those directions.

Figure 4:
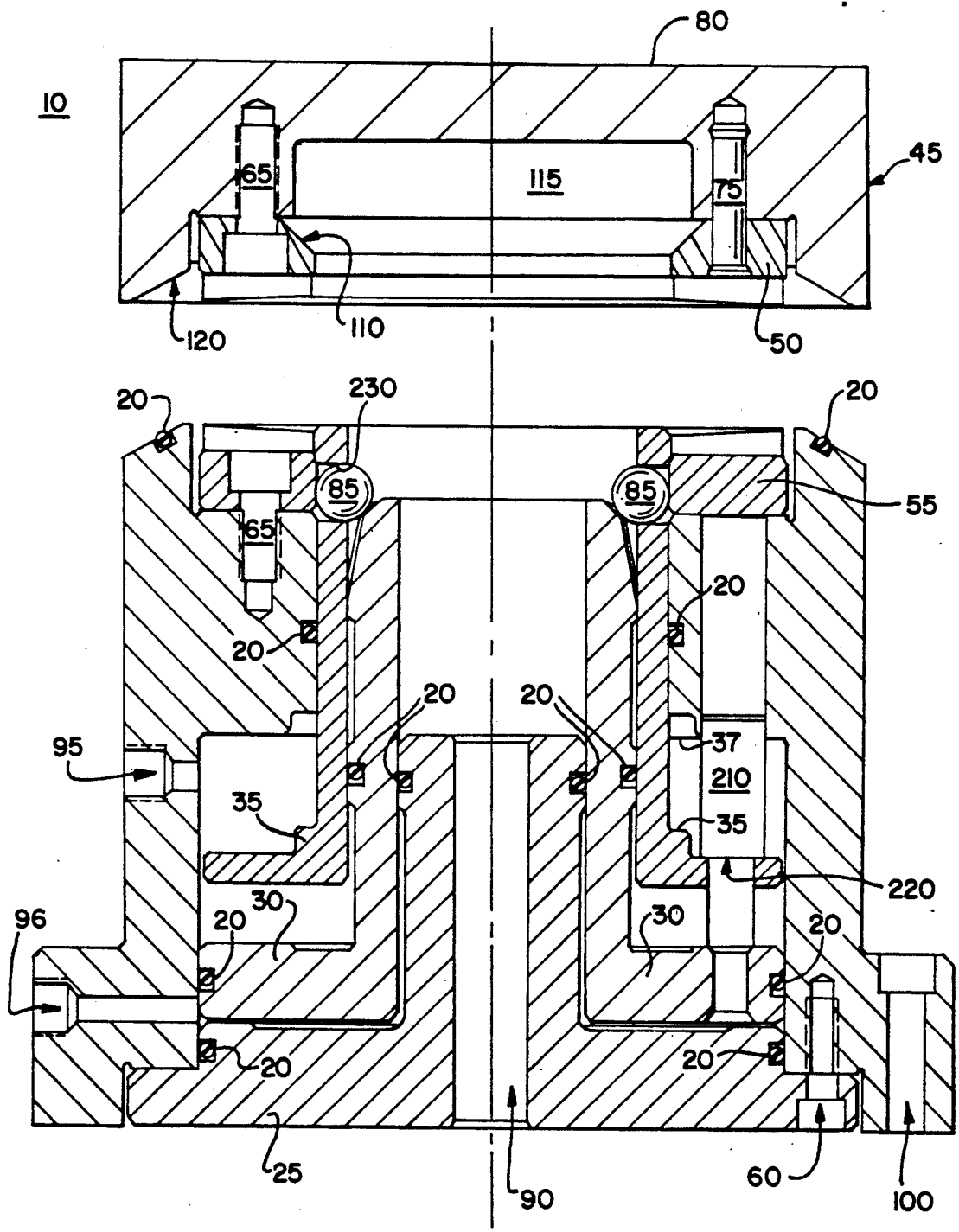
FIG. 4 is a side cross-sectional view of an alternative combined guide pin and unlocking mechanism embodiment of the present invention.
Figure 5:
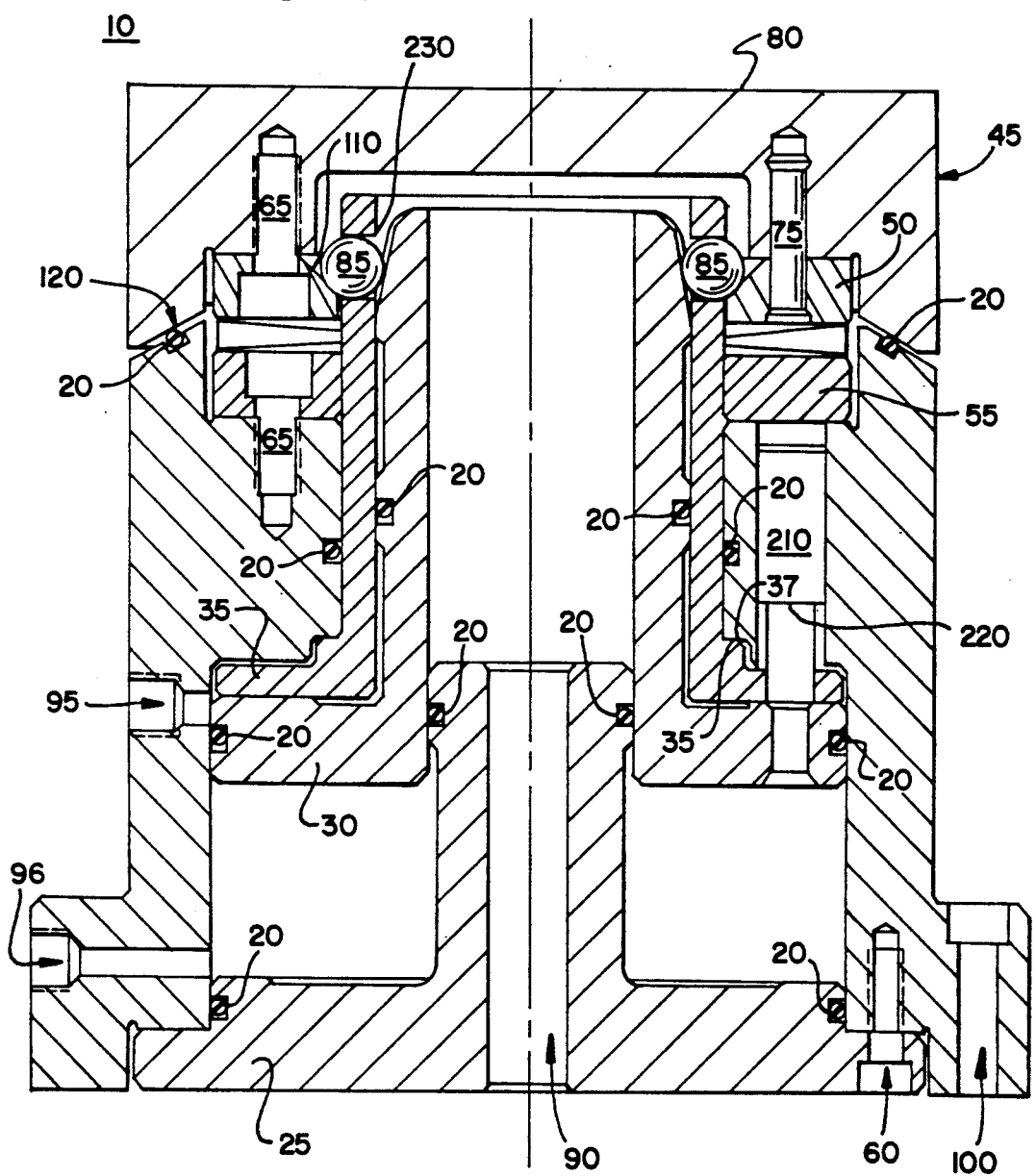
FIG. 5 is a side cross-sectional view of the alternative embodiment shown in FIG. 4 in a coupled and locked mode of the present invention.
Figure 6:
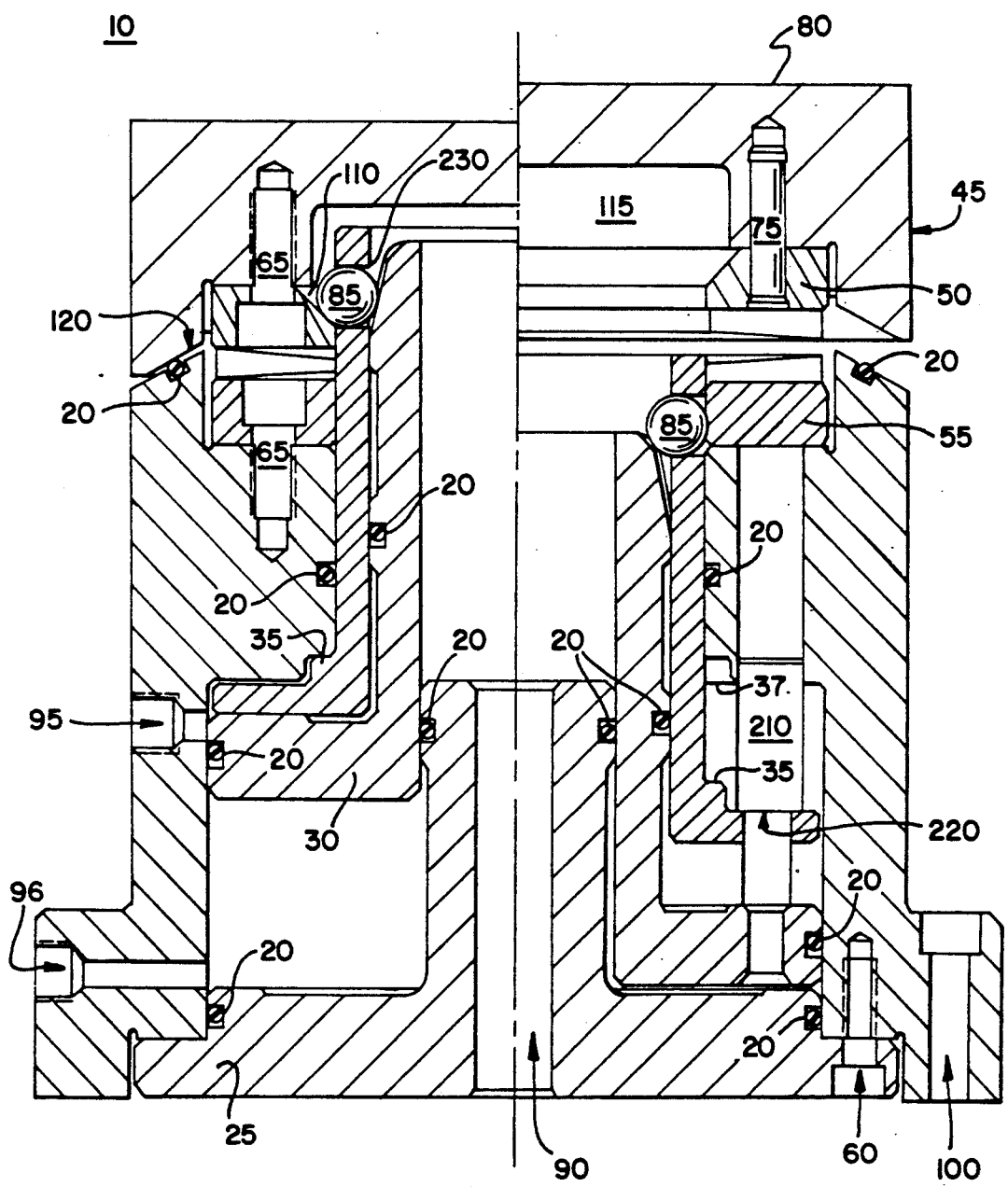
FIG. 6 is a side cross-sectional view of the alternative embodiment shown in FIG. 4 in which one half the pallet is coupled and locked and one half is unlocked and the pallet is being removed.

Shown in FIG. 4 is a side cross sectional view of a first alternative embodiment of the combined guide pin and unlocking mechanism of the invention 10 in the uncoupled position of the present invention. In FIG. 5, invention 10 is depicted in the fully coupled carrier and pallet position. In FIG. 6 depicted on the left hand half is a fully coupled pallet assembly 45 and actuator base 15 and the right hand half is in the uncoupled position. The combined guide/pin and unlocking mechanism shown in this first alternative embodiment as shown in FIGS. 4, 5 and 6 is similar to the preferred embodiment depicted in FIGS. 1, 2, 3 and 9. It differs however, in that there is a guide pin/unlocking unit 210 which provides an alternative method of guiding the actuator's travel and unlocking means. As piston and cam 30 is lowered, guide pin/unlocking unit 210 actuator surface 220 strikes piston ball retainer 35 pulling it downward in a corresponding motion to piston and cam 30 to unlock the ball bearings 85 in piston ball retainer 35.

The first alternative embodiment utilizing a combined guide pin and unlocking unit 210 as shown in FIGS. 4, 5 and 6, differs from the preferred embodiment shown in FIGS. 1, 2, 3 and 9 by the following. The preferred embodiment contains a snap ring 40 which serves as an unlocking actuation mechanism only. The first alternate embodiment combines a guide pin and unlocking actuating mechanism 210 to provide two functions in the same component as an alternate to the separate components, guide 105 and snap ring 40 as shown in the preferred embodiment. Guide pin 105 guides and snap ring 40 unlocks in the same manner as guide pin/unlocking unit 210 in the first alternative embodiment. Guide pin/unlocking unit 210 does both the guide pin function and unlocking functions in the same component.

Figure 7:
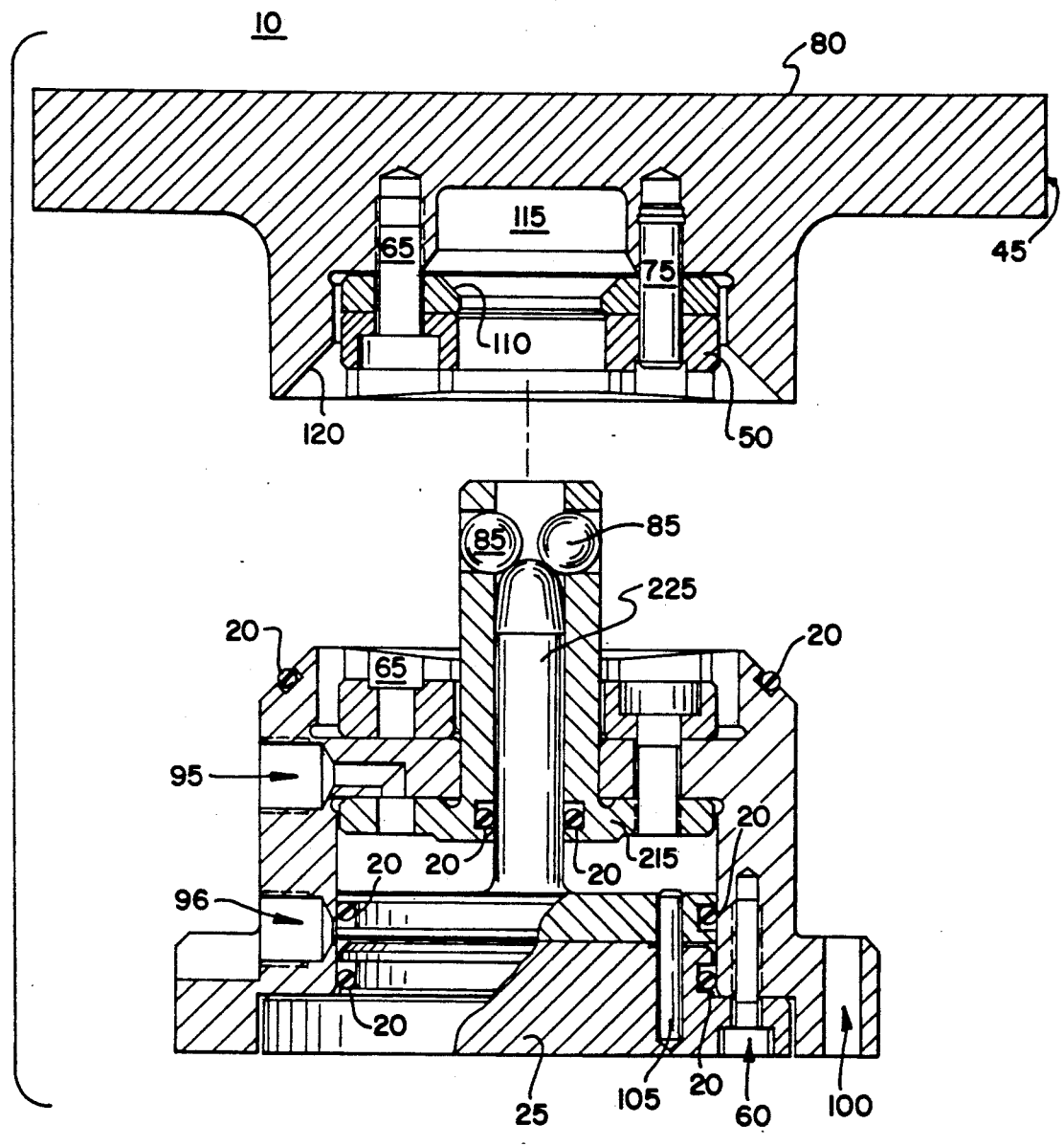
FIG. 7 is a side cross-sectional view of the alternative static locking core receiver embodiment in the uncoupled mode.
Figure 8:
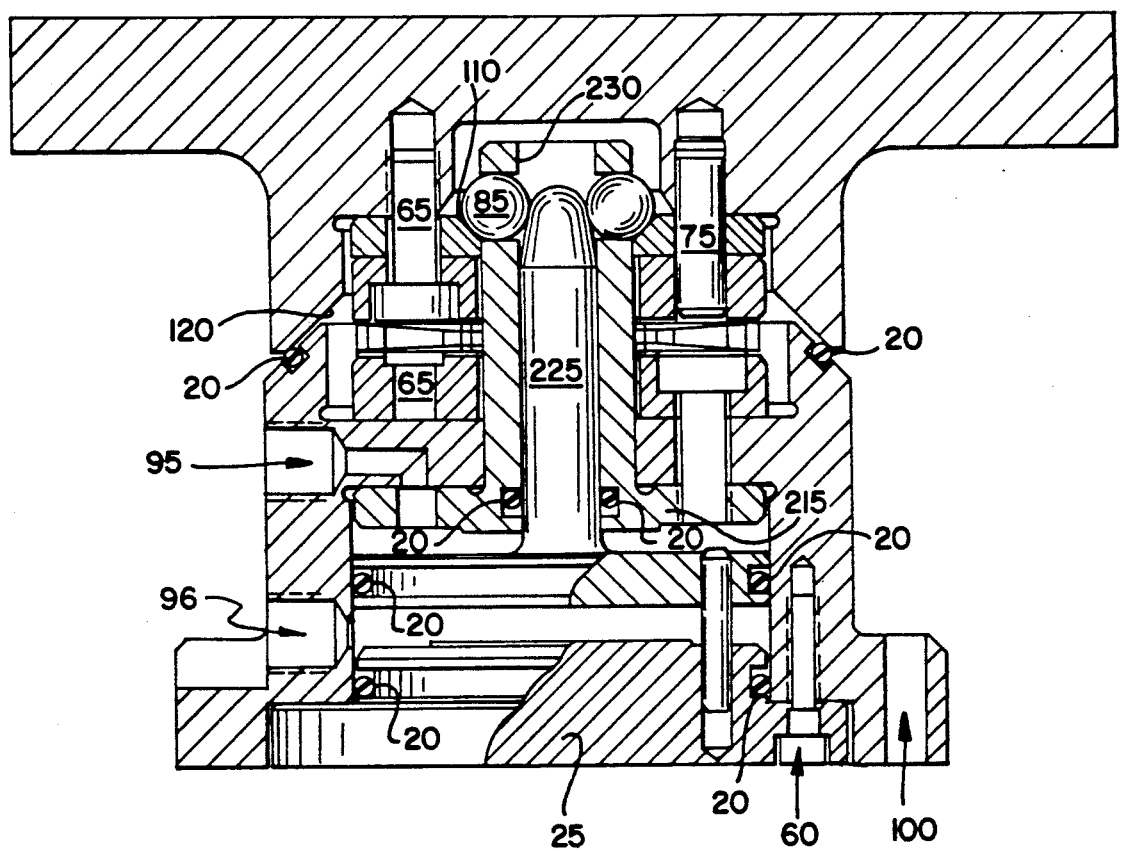
FIG. 8 is a side cross-sectional view of the alternative static locking core receiver embodiment in the coupled mode.
Figure 9:
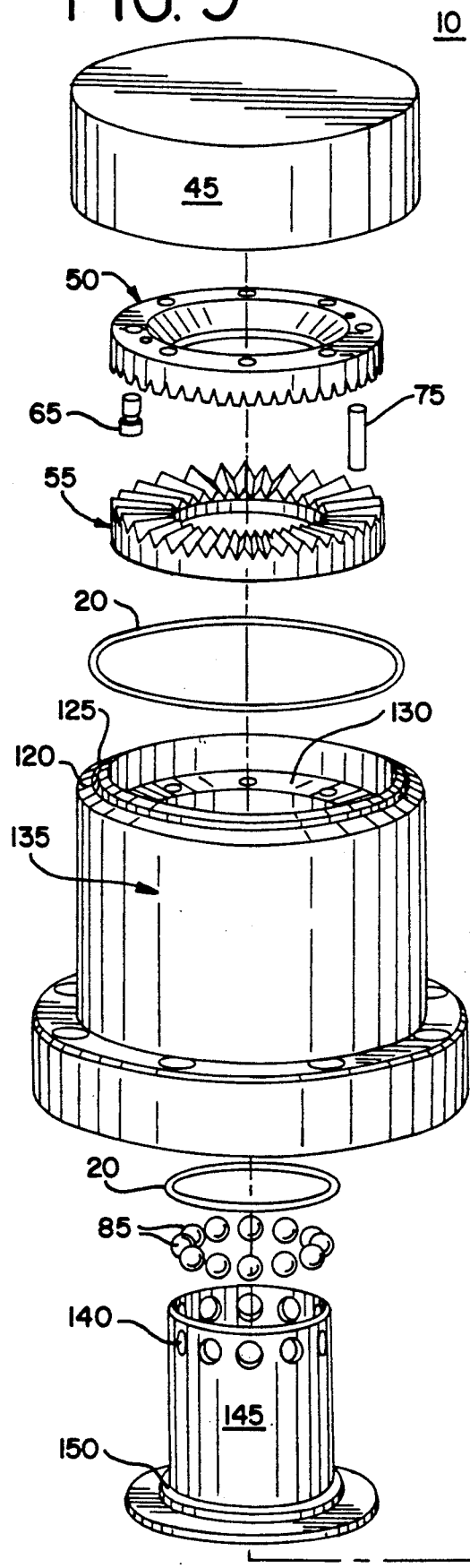
FIG. 9 is an exploded perspective view of the preferred embodiment of the present invention.
Figure 9:
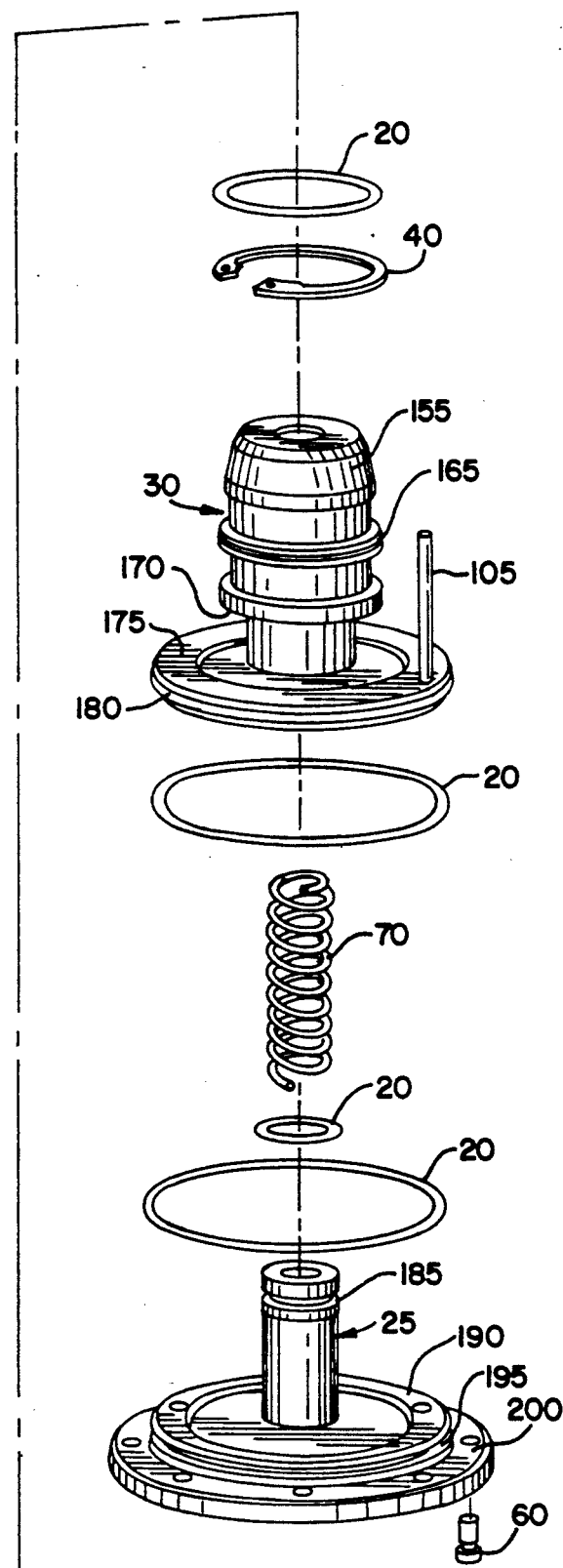

A second alternative embodiment is of the static locking core receiver type and is depicted in FIGS. 7 and 8.

In FIG. 7, the static ball retainer 215, the pallet assembly 45 and the actuator base 15 are depicted in the starting position with the ball bearings 85 retracted and unlocked and the piston locking cam 30 in the lowest position. The pallet assembly 45 is then placed over the core guide 25 and lowered onto the actuator base 15 where the pallet and base multitoothed couplings 50, 55 interface, mesh and lock. The piston cam 225 is forced upward to force outwardly the ball bearings 85 against locking face 110 which correspondingly locks the pallet assembly 45 between locking face 110, ball bearings 85 and locking cam surface 155. The pallet assembly 45 is then in its fully locked and coupled position awaiting any desired machining operations to be performed on workpiece which is positioned on surface 80. The invention 10 is then in the locked position as shown in FIG. 8.

After the machining of the workpiece has been completed, the pallet assembly 45 is released by applying air or other media to the upper actuation media port 95 which forces piston cam 225 downward allowing the ball bearings 85 to retract inward towards the center thereby freeing the locking actuator and allowing pallet assembly 45 to be lifted vertically to afford clearance of pallet and base multitoothed carrier rings 50 and 55. The pallet assembly 45 is then free to move in any direction vertically or horizontally and to alternate locations as desired.

It is understood from the above description of the preferred, first and second alternative embodiments, that there are many different means of configuring the piston-cam assembly, locking mechanism and force driving sources while performing the inventive purpose of the present invention.

For example, the piston assemblies described above may be, for example only, an electro-mechanical device such as solenoid. The locking mechanisms may be a free floating lever arm which would be co-axial with the piston to lock the pallet base to the pallet. A spherical body or a number of spherical bodies such as ball bearings may also be used to lock the piston and cam to prevent unintended disengagement of the pallet base from a coupled pallet.

The complementary multitoothed rings mounted on the pallet base and on the underside of the pallet may be configured in many different pitch angles, numbers of teeth and other configurations to achieve the desired result and purpose.

The force driving means applied at the media ports may be pneumatic, hydraulic, electro-mechanical or mechanical, all to be selectively applied to activate or deactivate the piston and cam assembly.

The foregoing specification describes only the preferred embodiment and alternatives of the invention as shown. Other embodiments besides the ones shown and described may be articulated as well. The terms and expressions therefore serve only to describe the invention by example only and not to limit the invention. It is expected that others will perceive differences which while differing from the foregoing, do not depart from the spirit and scope of the invention herein described and claimed.

What we claim is:

1. An actuator device for energizing a pallet bas coupling for selectively coupling a complementary pallet, comprising:
   coupling means for coupling said pallet base with said complementary pallet, said coupling means comprising complementary multitoothed rings;
   piston means and cam means for activating the pallet base coupling, said piston means coaxial with said cam means; and
   force driving means for selectively activating said piston and cam means.

2. An actuator device for energizing a pallet base coupling for selectively coupling a complementary pallet, comprising:
   coupling means for coupling said pallet base with said complementary pallet, said coupling means comprising complementary multitoothed rings;
   mechanical piston means and cam means for activating the pallet base coupling, said mechanical piston means coaxial with said cam means; and
   force driving means for selectively activating said piston and cam means.

3. An actuator device for energizing a pallet base coupling for selectively coupling a complementary pallet, comprising:
   coupling means for coupling said pallet base with said complementary pallet, said coupling means comprising complementary multitoothed rings;
   electro-mechanical piston means and cam means for activating the pallet base coupling, said electro-mechanical piston means coaxial with said cam means; and
   force driving means for selectively activating said piston and cam means.

4. The actuator device of claims 1 or 2 or 3 wherein said force driving means is pneumatic.

5. The actuator device of claims 1 or 2 or 3 wherein said force driving means is hydraulic.

6. The actuator device of claims 1 or 2 or 3 wherein said force driving means is electro-mechanical.

7. The actuator device of claims 1 or 2 or 3 wherein said force driving means is mechanical.

8. An actuator device for energizing a pallet base coupling for selectively coupling a complementary pallet, comprising:
   a first multitoothed ring in said pallet base;
   a second multitoothed ring in said complementary pallet;
   at least one piston means for activating the coupling;
   pivoting floating lever means for locking said piston means, said lever means co-axial with said piston means; and
   force driving means for selective activation of said piston means, said first multitoothed ring interfacing, meshing, and locking with said second multitoothed ring when said piston means is activated.

9. An actuator device for energizing a pallet base coupling for selectively coupling a complementary pallet, comprising:
   a first multitoothed ring in said pallet base;
   a second multitoothed ring in said complementary pallet;
   at least one mechanical piston means for activating the coupling;
   pivoting floating lever means for locking said mechanical piston means, said lever means co-axial with said mechanical piston means; and
   force driving means for selective activation of said piston means, said first multitoothed ring interfacing, meshing, and locking with said second multitoothed ring when said mechanical piston means is activated.

10. An actuator device for energizing a pallet base coupling for selectively coupling a complementary pallet, comprising:
   a first multitoothed ring in said pallet base;
   a second multitoothed ring in said complementary pallet;
   at least one electro-mechanical piston and cam means for activating the coupling;
   lever means for locking said electro-mechanical piston and cam means, said lever means co-axial with said electro-mechanical piston and cam means; and
   force driving means for selectively activating said electro-mechanical piston and cam means, said first multitoothed ring interfacing, meshing, and locking with said second multitoothed ring when said electro-mechanical piston and cam means is activated.

11. The actuator device of claims 8 or 9 or 10 wherein said force driving means is pneumatic.

12. The actuator device of claims 8 or 9 or 10 wherein said force driving means is hydraulic.

13. The actuator device of claims 8 or 9 or 10 wherein said force driving means is electro-mechanical.

14. The actuator device of claims 8 or 9 or 10 wherein said force driving means is mechanical.

15. The actuator device of claims 8 or 9 or 10 or 11 or 12 or 13 or 14, wherein said piston means are co-axial.

16. An actuator device for selectively coupling a pallet with a complementary pallet base, comprising:
   coupling means for coupling the pallet with the complementary multitoothed rings;
   piston and cam means for energizing said coupling means;
   pivoting floating lever means for locking said piston and cam means; and
   force driving means for selectively activating said piston and cam means.

17. The actuator device of claim 16, wherein said pivoting floating lever means is a sphere retained by said piston and cam means.

18. The actuator device of claims 16 or 18, wherein said force driving means is pneumatic.

19. The actuator device of claims 16 or 18, wherein said force driving means is hydraulic.

20. The actuator device of claims 16 or 18, wherein said force driving means is electro-mechanical.

21. The actuator device of claims 16 or 18, wherein said force driving means is mechanical.

22. The actuator device of claims 16 or 17 or 18 or 19 or 20 or 21 wherein said piston means are co-axial.

23. The actuator device of claims 16 or 17 or 18 or 19 or 20 or 21 or 23 further comprising a spring means to substitute for said piston and cam means if said force driving means should inadvertently fail.

24. The actuator device of claims 1 or 2 or 3 or 4 or 5 or 6 or 7 or 8 or 9 or 10 or 11 or 12 or 13 or 14 or 15 or 16 or 17 or 18 or 19 or 20 or 21 or 22 or 23 further comprising a complementary pair of multitoothed rings, said rings affixed to the pallet and the complementary pallet base.

25. An actuator device, comprising:
   pallet means for supporting an associated workpiece, said pallet means having first and second ends, said first end supports an associated workpiece and said second end having a multitoothed ring;
   pallet base, having an interior and an exterior, said exterior having a multitoothed ring complimentarily with said multitoothed ring of said second end of said pallet means;
   piston and cam means for driving said multitoothed ring of said pallet base to complimentarily mesh with said multitoothed ring of said pallet means, said piston and cam means internal to said pallet base; and
   force driving means for selectively activating said piston and cam means, said force driving means applied to said interior of said pallet base.

26. The actuator device of claim 25 wherein said piston and cam means is mechanical.

27. The actuator device of claim 25, wherein said piston and cam means is electro-mechanical.

28. The actuator device of claims 25 or 26 or 27 wherein said force driving means is pneumatic.

29. The actuator device of claims 25 or 26 or 27 wherein said force means is hydraulic.

30. The actuator device of claims 25 or 26 or 27 wherein said force driving means is electro-mechanical.

31. The actuator device of claims 25 or 26 or 27 or 28 or 29 or 30 further comprising a means for locking said complementary multitoothed rings together or apart.

32. The actuator device of claim 31 wherein said locking means is a floating lever arm.

33. The actuator device of claim 31 wherein said locking means is at least one spherical body retained by said piston and cam means.

34. The actuator device of claims 25 or 26 or 27 or 28 or 29 or 30 or 31 or 32 or 33 wherein said piston and cam are co-axial.

* * * * *